United States Patent [19]
Magera

[11] Patent Number: 4,687,027
[45] Date of Patent: Aug. 18, 1987

[54] INSULATOR FOR WATER-COOLED SKID AND CROSSOVER PIPE NETWORK

[76] Inventor: Matthias R. Magera, R.D. #4, Box 13, McDonald, Pa. 15057

[21] Appl. No.: 832,018

[22] Filed: Feb. 24, 1986

[51] Int. Cl.$^4$ .................. F16L 9/22; F27D 3/02

[52] U.S. Cl. .................. 138/149; 138/157; 138/162; 432/234

[58] Field of Search .................. 138/149, 156, 157, 162; 432/233, 234

[56] References Cited

U.S. PATENT DOCUMENTS

| | | | |
|---|---|---|---|
| 4,087,501 | 5/1978 | Moser | 138/149 X |
| 4,182,609 | 1/1980 | Hovis et al. | 138/149 X |
| 4,296,781 | 10/1981 | Magnus | 138/157 X |
| 4,305,706 | 12/1981 | Brungraber | 138/149 X |
| 4,312,385 | 1/1982 | Magera | 138/149 |
| 4,428,730 | 1/1984 | Holmes et al. | 138/149 X |

*Primary Examiner*—James E. Bryant, III
*Attorney, Agent, or Firm*—William J. Ruano

[57] ABSTRACT

A refractory insulator for insulating the joint between a long skid pipe, a supporting crossover pipe at right angles, and a riser for supporting both. The insulator comprises two halves each having a top portion and two pivoted lower side portions. When the halves are abutted, and the pivoted lower side portions are wrapped around the crossover pipe, the insulator will effectively seal the joint between these two pipes at the point of support by the riser. The pivoted portions are formed by reticulated wires embedded along the inner surface of the insulator and which provide pivotal joints between the upper portion and two lower side portions. The gaps at the pivoted joints can then be filled with insulating grout material.

2 Claims, 4 Drawing Figures

INSULATOR FOR WATER-COOLED SKID AND CROSSOVER PIPE NETWORK

This invention relates to a ceramic insulator, and, more particularly, to one for insulating the joint between a long skid pipe and a crossover pipe as used in a reheating furnace.

An outstanding disadvantage of the above-mentioned joint is that the great difficulty has been experienced in the past in applying insulation to such joints, particularly in the time element of installation, as well as the accuracy of the fit. Small pieces have been fastened together with intricate complexity, adding greatly to the cost as well as to the down time for replacing the insulators.

An object of the present invention is to overcome the abovenamed disadvantages by providing a novel insulator assembly in the form of halves with pivotal depending portions for easily and quickly completely surrounding a joint between the long skid and crossover pipes at the point of support by the riser.

Other objects and advantages of the invention will become more apparent from a study of the following description taken with the accompanying drawing wherein.

Figure 1:
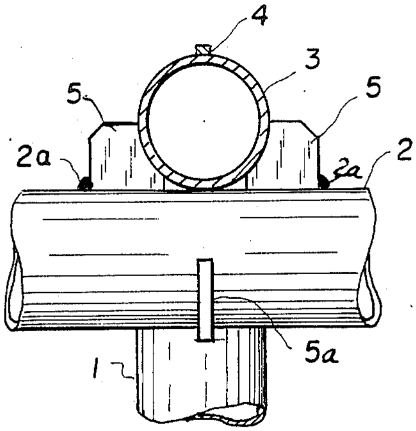
FIG. 1 is an elevational view of a joint between a long skid pipe, a crossover pipe, and a riser, shown without insulation.
Figure 2:
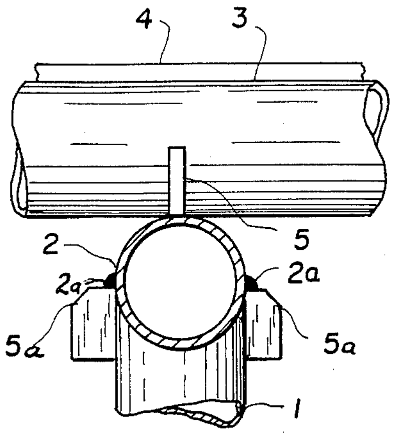
FIG. 2 is another elevational view taken from the side of FIG. 1.

Referring more particularly to FIGS. 1 and 2 of the drawings, numeral 1 denotes a riser or vertical support for the piping to be described hereinafter. Riser 1 has welded thereto saddles **5*a*,5*a* which support a crossover pipe 2 by means of welded joints 2*a*. A long skid pipe 3 having a welded rail 4, is supported in saddles 5,5 which are welded at 2*a*,2*a* to a crossover pipe 2**.

Figure 3:
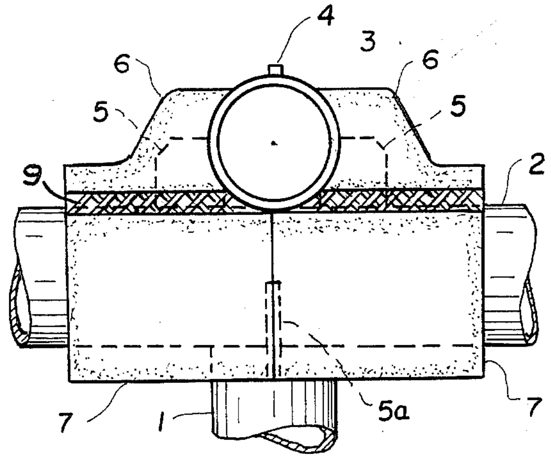
FIG. 3 is an elevational view of the joint shown in FIG. 1 with insulation halves mounted thereon in accordance with the present invention.
Figure 4:
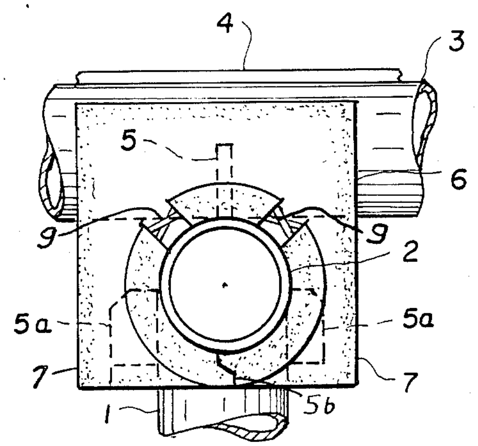
FIG. 4 is another elevational view taken along a side of FIG. 3.

FIGS. 3 and 4 show the same structures as FIGS. 1 and 2, respectively, with insulation covering the joint in accordance with the present invention.

A refractory, preferably of high alumina composition, is made up of two separate halves 6,6 onto which lower portions 7,7 are pivotally connected by means of a reticulated wire 9 which is embedded adjacent the inner surfaces of the lower crossover surrounding portions 7,7 by providing a gap between the top portions 6,6 of the composite insulator halves and the lower portions 7,7. Such lower portions are spread apart at the pivotal joints 9,9 from each other before mounting on the crossover pipe 2, and thereafter, pulled together and closed at joint **5*b* of stepped outline. The gaps forming the pivotal joint are then filled with ceramic mortar or grout so as to complete the assembly. Inside of the lower halves 7,7, a vertical void is provided for closely surrounding the top portion of the riser 1 and saddles 5*a*,5*a***.

Thus it will be seen that I have provided a refractory insulator conveniently made up of two halves for assembly in butting relationship, each half provided with two lower portions for surrounding the crossover pipe,—the upper half supporting a substantial portion of the long skid pipe, whereby the composite insulator may be very quickly installed, saving enormous down time and effecting great economy for insulating the intricate joint of a long skid, crossover and riser combination.

While I have illustrated and described several embodiments of my invention, it will be understood that these are by way of illustration only and that various changes and modifications may be contemplated in my invention and within the scope of the following claims.

I claim:

1. For use to insulate the joint between a long skid pipe lying, at right angles, on a crossover pipe in a reheating furnace; the invention comprising two refractory insulator halves, each half having a top portion and two pivoted lower side portions extending at right angles to said top portion comprising a pair of refractory insulator halves, each half having a substantially semicircular arcuate inner surface for abutting against and substantially surrounding a correspondingly shaped outer surface of said long skid pipe, said lower side portions comprising refractory insulator portions, each lower side portion is pivotally connected to one of said upper insulator refractory insulator halves through reticulated wires embedded in said upper and lower refractory insulator halves at the top portion of said crossover pipe, whereby said lower refractory insulator halves may be pivotally opened or closed through said reticulated wires in surrounding relationship to said crossover pipe.

2. The insulator recited in claim 1 wherein saddles support said long skid pipe and said crossover pipe and wherein correspondingly shaped grooves are provided in said top portion to snugly surround said saddles.

* * * * *